Patented June 1, 1937

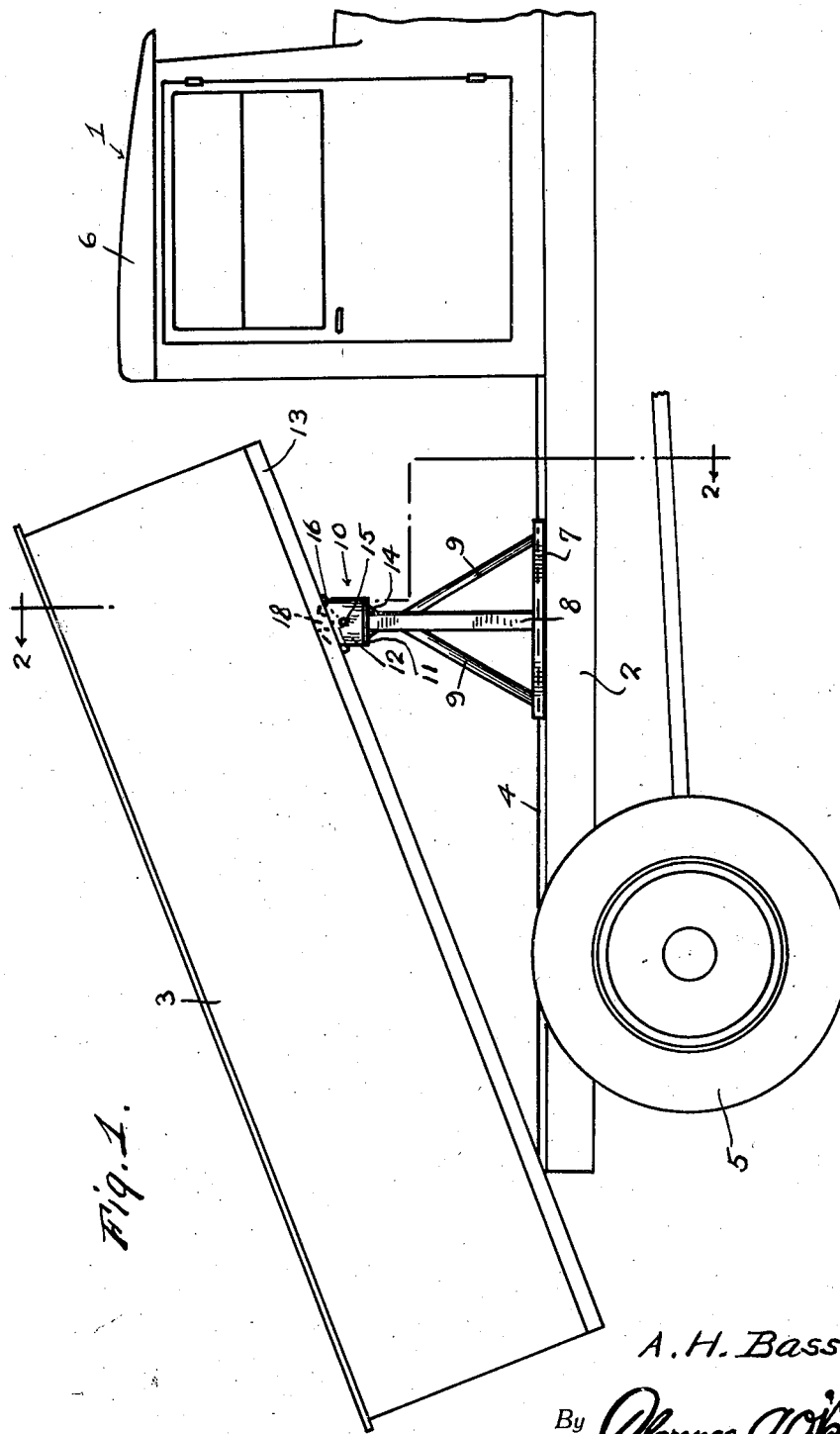

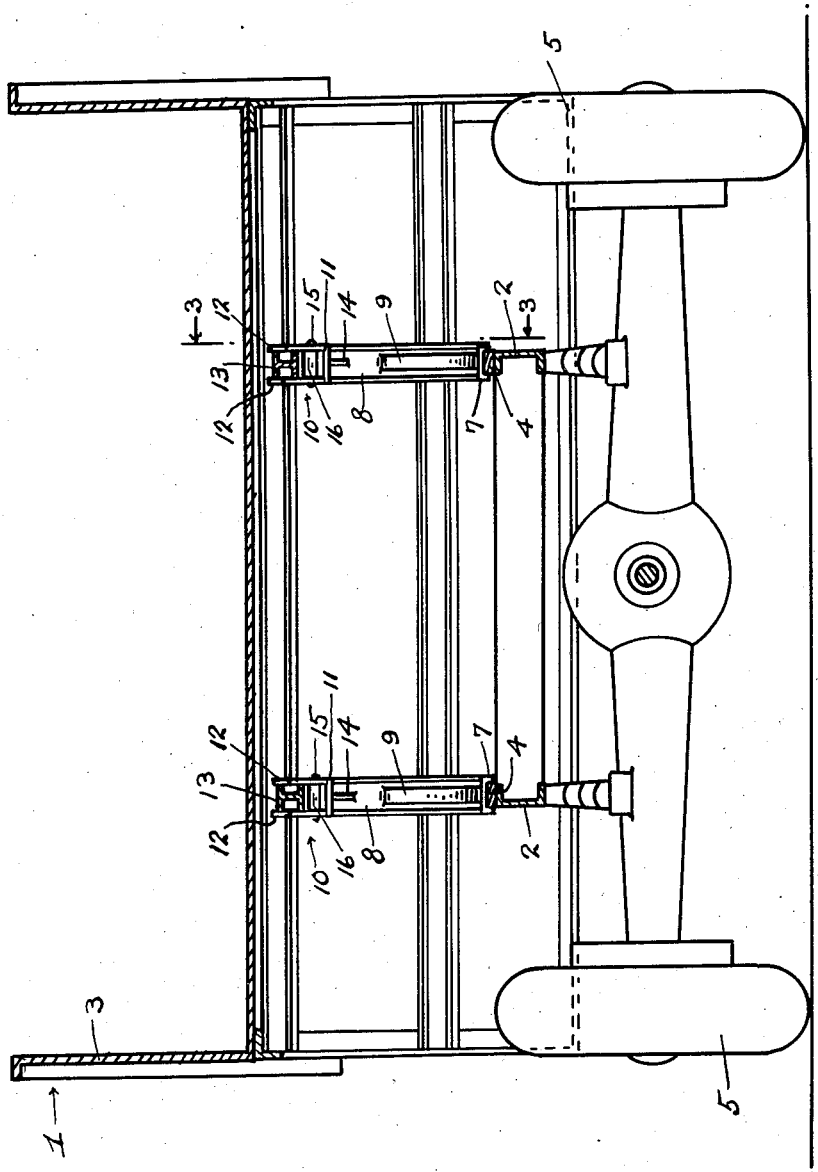

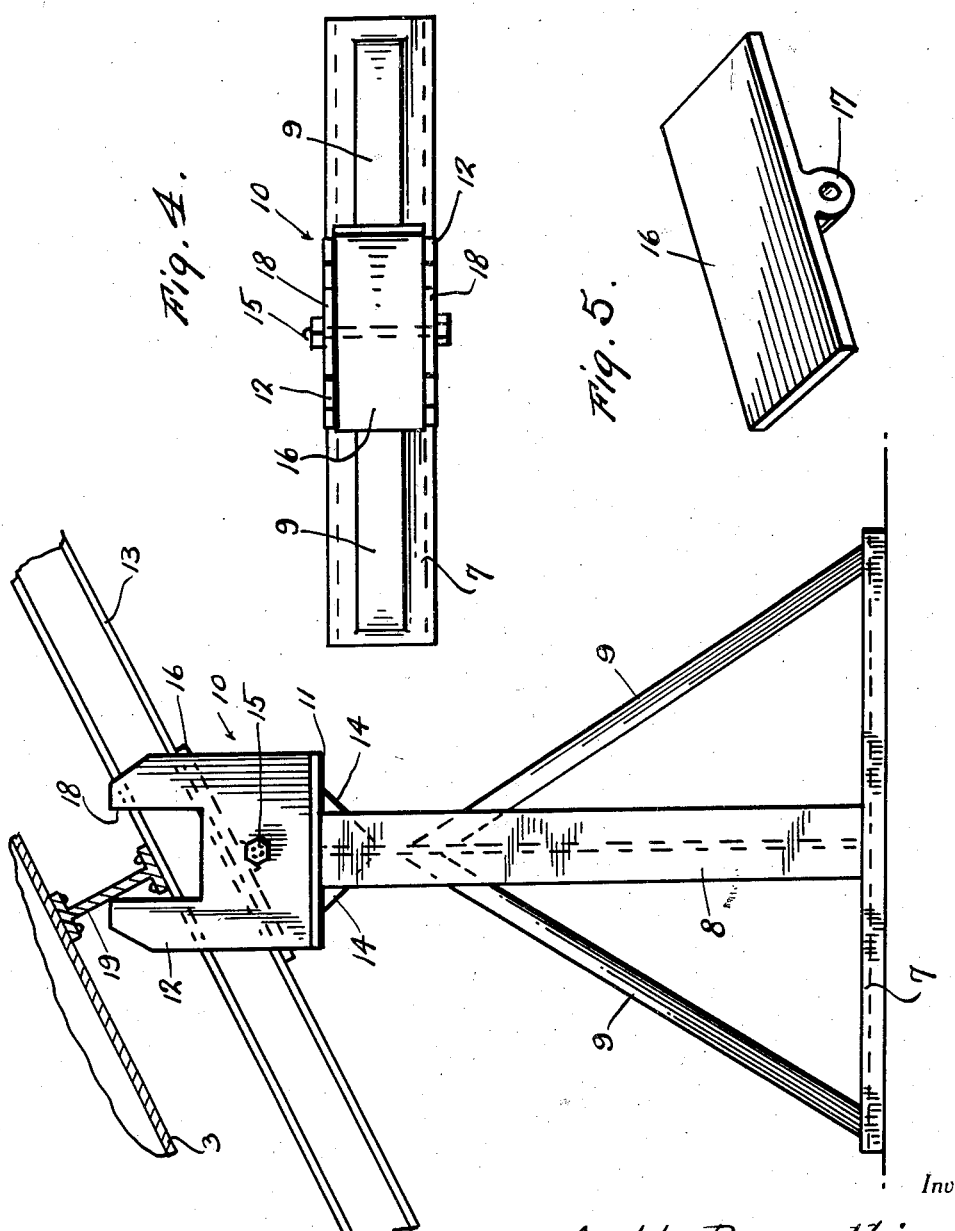

2,082,139

UNITED STATES PATENT OFFICE 2,082,139

SAFETY BRACKET FOR DUMP BODIES

Adam H. Bassetti, West Haven, Conn.

Application June 20, 1936, Serial No. 86,428

2 Claims. (Cl. 248—351)

The present invention relates to new and useful improvements in safety brackets for dump bodies and has for its primary object to provide, in a manner as hereinafter set forth, means for positively supporting the body of a dump truck in elevated position even under excessive loads and strains, thereby permitting workmen to operate under the body in complete safety.

Another very important object of the invention is to provide a safety bracket of the aforementioned character for dump truck bodies embodying novel supporting elements engageable with the body and adapted for automatic adjustment to the angle of said body.

Still another very important object of the invention is to provide a safety bracket of the character described which is adapted to be mounted on the chassis of the truck and which includes means cooperable with the truck body for preventing longitudinal movement or slipping of said bracket.

A still further important object of the invention is to provide a safety bracket of the character set forth which may be conveniently applied without altering the truck in any way and easily removed when desired.

Other objects of the invention are to provide a safety bracket for dump bodies which will be comparatively simple in construction, strong, durable, highly efficient and reliable in use, compact, light in weight and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:—

Figure 1 is a view in side elevation of a dump truck with a pair of safety brackets constructed in accordance with the present invention mounted in position thereon.

Figure 2 is a view in transverse section through the dump truck, taken substantially on the line 2—2 of Figure 1, looking in the direction indicated by the arrows.

Figure 3 is a fragmentary view in vertical longitudinal section, taken substantially on the line 3—3 of Figure 2.

Figure 4 is a view in top plan of the invention.

Figure 5 is a detail view in perspective of the rockable supporting plate constituting an important part of the invention.

It may be well to state at the outset that it is preferable that two of the safety brackets be used for supporting the body.

Referring now to the drawings in detail, it will be seen that the reference numeral 1 designates generally a conventional dump truck comprising a chassis including the usual longitudinal side members 2 and a dump body 3 mounted for swinging movement in a vertical plane on said chassis. Mounted on the side members 2 of the frame are the usually wooden sills 4. The reference numeral 5 designates the rear wheels of the vehicle and 6 is the cab.

The embodiment of the present invention which has been illustrated comprises a metallic base 7 in the form of a channel iron which is adapted to be mounted longitudinally on one of the sills 4 beneath the forward portion of the body 3. Rising from the central portion of the base 7 is a metallic post 8 in the form of an I-beam which is provided with braces 9.

The reference numeral 10 designates generally a metallic head which is rigidly mounted on the upper end of the post 8, said head including a bottom plate 11 from which side members 12 rise. The side members 12 are adapted to receive one of the longitudinal beams 13 beneath the body 3 therebetween. Substantially triangular metallic reinforcing webs 14 are provided for the head 10. Extending between the side members 12 is a bolt or pin 15 on which a supporting plate 16 is rockably mounted. As shown to advantage in Figure 5 of the drawings, the supporting plate 16 is provided, at an intermediate point, with a bearing 17 which is journaled on the bolt or pin 15.

The rockable plate 16 is engageable beneath the longitudinal beam 13. The side members 12 of the head 10 have formed therein notches or recesses 18 for the reception of one of the cross beams 19 of the truck body 3. This is illustrated to advantage in Figure 3 of the drawings.

It is thought that the operation of the invention will be readily apparent from a consideration of the foregoing. When work is to be done beneath the truck body said body is elevated sufficiently to permit a pair of the safety brackets to be mounted on the sills 4, care being taken to position the notches or recesses beneath one of the forward cross beams 19. The body is then lowered until the longitudinal beams 13 come to rest on the rockable plates 16, said plates automatically adjusting themselves to the inclination of the body. With one of the cross beams 19 engaged in the recesses or notches 18, as seen in Figure 3, longitudinal movement of the safety brackets will be positively prevented. It will be observed that the entire invention is of metal and the joints are preferably welded. Of course, to remove the safety brackets it is only necessary to elevate the body sufficiently to permit said brackets to be taken from therebeneath.

It is believed that the many advantages of a dump body safety bracket constructed in accordance with the present invention will be readily understood, and although a preferred embodiment of the device is illustrated and described, it is to be understood that changes in the details of construction and in the combination and arrangement of parts may be resorted to which will fall within the scope of the invention as claimed.

What is claimed is:—

1. A safety bracket for vehicle dump bodies of the type including transverse and longitudinal supporting beams, comprising a post adapted to be mounted on the vehicle, and a head mounted on said post, said head including spaced, opposed side members adapted to receive one of the longitudinal beams therebetween, said side members having recesses therein for the reception of one of the transverse beams, and a plate rockably mounted between the side members and engageable beneath said one longitudinal beam.

2. A safety bracket for vehicles of the type including a frame and a dump body hingedly mounted on said frame, said body including transverse supporting beams and longitudinal supporting beams mounted beneath said transverse beams, comprising a substantially channel-shaped base adapted to be mounted on the frame, a post rising from said base, a substantially U-shaped head mounted on the post and adapted to receive one of the longitudinal beams therebetween, said head having recesses therein for the reception of one of the transverse beams.

ADAM H. BASSETTI.